(12) United States Patent
Kobayashi

(10) Patent No.: US 6,970,428 B1
(45) Date of Patent: Nov. 29, 2005

(54) APPARATUS USING IN-BAND TYPE ACCESS SYSTEM

(75) Inventor: Seiichi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/484,722

(22) Filed: Jan. 18, 2000

(30) Foreign Application Priority Data

Jan. 18, 1999 (JP) .................................. 11-009420

(51) Int. Cl.[7] .......................... H04L 12/28; H04L 12/56
(52) U.S. Cl. ................. 370/241; 370/395.1; 370/395.5
(58) Field of Search .......................... 370/389, 395.1, 370/395.5, 395.51, 395.6, 397, 399, 401, 370/409, 419, 420, 421, 474, 524, 466, 467, 370/395.53, 352–354, 395, 473, 476, 241

(56) References Cited

U.S. PATENT DOCUMENTS

| 5,608,720 A | * | 3/1997 | Biegel et al. ................ 370/249 |
| 5,638,364 A | * | 6/1997 | Sugita ......................... 370/397 |
| 5,777,994 A | * | 7/1998 | Takihiro et al. ....... 370/395.53 |
| 5,796,736 A | * | 8/1998 | Suzuki ........................ 370/254 |
| 6,018,625 A | * | 1/2000 | Hayball et al. ............... 703/22 |
| 6,028,863 A | * | 2/2000 | Sasagawa et al. .......... 370/399 |
| 6,115,382 A | * | 9/2000 | Abe ......................... 370/395.3 |
| 6,289,018 B1 | * | 9/2001 | Song ....................... 370/395.6 |
| 6,345,054 B1 | * | 2/2002 | Sasaki ........................ 370/465 |
| 6,363,064 B1 | * | 3/2002 | Yamaguchi ................. 370/352 |
| 2002/0061017 A1 | * | 5/2002 | Shibuya ..................... 370/389 |

FOREIGN PATENT DOCUMENTS

| EP | 0 682 429 | 11/1995 |
| JP | 8-274784 | 10/1996 |

OTHER PUBLICATIONS

Kositpaiboon, et al., "Customer Network Management For B-ISDN/ATM Services" Proceedings of the International Conference on Communications, May 23, 1993: vol. 3, pp. 1-7, XP010136856 ISBN: 0-7803-0950-2.
Banerjee, et al., "Carrier and Customer Management of Fast Packet Services and ATM", IEEE vol. 2, Feb. 14, 1994, pp. 576-586 XP010260987.
Miyoshi, et al., "LAN/WAN Management Integration Using ATM CNM Interface" 1996 IEEE Network Operations and Management Symposium, vol. 1, SYMP. 5, Apr. 15, 1996 pp. 12-21, XP000641074, ISBN: 0-7803-2519-2.
Yong-Hoon Choi, et al., "A Method of Gathering End-To-End Management Information" Network Operations and Management Symposium, 1998 Feb. 15, 1998, pp. 849-858, XP010267451, ISBN: 0-7803-4351-4.
Chinese Office Action dated Oct. 15, 2004.
Rungroj Kositpaiboon et al. Customer Network Management for B-ISDN/ATM Services. IEEE 1993.

* cited by examiner

Primary Examiner—Huy D. Vu
Assistant Examiner—Daniel Ryman
(74) Attorney, Agent, or Firm—Katten Muchin Rosenman LLP

(57) ABSTRACT

A transmission apparatus includes a part which sets a resource management information path based on a given network management protocol onto PVC logically set traffic defined in ATM switching so that a customer network management agent process and a user network management system can communicate with each other.

7 Claims, 9 Drawing Sheets

APPARATUS USING IN-BAND TYPE ACCESS SYSTEM

BACKGROUND OF THE INVENTION

1. Field of the Invention

The present invention relates to a transmission apparatus using an in-band type SNMP (Simple Network Management Protocol) system.

2. Description of the Related Art

In a general transmission system, a group of apparatuses linked via transmission spans is located in a network forming the transmission system in a distributed formation. In such a real network configured by points (a group of apparatuses) and lines (a group of transmission lines), it is required to provide a management means or method for integrally managing the group of apparatuses and the group of transmission lines in such a manner that the network formed thereof is handled as only one object for management. Such a management means makes it possible to link the apparatuses arranged in the distributed formation and thus bring up the network to only one object.

In an STM (SONET/SDH) transmission system, the management means or method is realized by using an overhead provided separately from a user data field (payload) in a transmission frame. In the overhead, two independent data communication channels are defined. More particularly, the above two independent data communication channels are respectively a section DCC (192 kbps) and a line DCC (576 kbps) where DCC is an abbreviation of Data Communication Channel. A data packet having a control information field is transmitted via the data communication channels. In the control information field, headers in the respective hierarchical levels based on the information switch method in the OSI-7 layer are stacked. Thus, information concerning the apparatuses collected on the node basis is collected and delivered.

In an ATM (Asynchronous Transfer Mode) transmission system, a capability of transmitting data via the above-mentioned data communication channels is defined when loaded with the payload. More particularly, such a payload created in an STM(SONET/SDH) system (SONET: Synchronous Optical NETwork/Synchronous Digital Hierarchy) is used as a carrier. A fundamental operation/function in which a cell is placed in a logical transmission path/channel dynamically (or statically) set is monitored based on ATM switch information with which switch intelligence parts of the respective apparatuses are linked via meta channels.

However, the conventional ATM transmission system mentioned above is restricted to only a system having an operation/function in which cells are added and dropped as data on the transmission path/channel logically set on the payload carrier. In other words, the conventional ATM transmission system is designed without taking into account management of apparatus information on the data transmission side prior to cell assembly and that on the data transmission side after cell disassembly in a case where a CLAD (Cell Layer Assembly Disassembly) unit is provided in the transmission apparatus. The CLAD unit has the function of converting the data accommodation format of cells into another format, for example, the data accommodation format of a package and vice versa.

The LAN-system CLAD units provided in the ATM system which are linked together (as starting points of cell generation and ending points of cell termination) to transport cells by using the logical paths/channels set between the CLAD units view the above ATM system as a virtual facility for conveying packets.

Originally, a site manager is defined in the management system of the LAN facility. An SNMP (Simple Network Management Protocol) application is utilized in the site manager. Management information collection and delivery by SNMP packets that are created and terminated by the SNMP application is replaced by an ILMI (Integrated/Interim Local Management Interface) which is defined on the virtual facility via which the LAN-system CLAD units are linked.

The transparency of management information collection and delivery based on the SNMP process by means of the ILMI can provide a guarantee within a request management area of the site manager placed on the real LAN facility which is not the virtual facility. However, the above transparency can manage only resources placed on the LAN facility, such as LAN-system terminals and routers (a group of LAN nodes) That is, the transparency excludes the CLAD units as objects for management.

In order to correlate the site manager with the resource information of the CLAD units themselves that connote the ATM transmission, it is required to provide SNMP-based information understandable by the site manager from the apparatus equipped with the CLAD unit, irrespective of whether the ATM transmission is connoted.

Conventionally, each of the apparatuses equipped with the CLAD units respectively provides, via a system separate from the system involved in transmission of the SNMP information concerning the ATM transmission, the site manager with the SNMP information concerning data transmission. The above separate system is a dedicated or leased communication line. Thus, the CLAD units are added to the site manager as additional objects for management.

The use of the dedicated communication line for management of the CLAD units does not flexibly cope with a change of connections between the CLAD units.

SUMMARY OF THE INVENTION

It is a general object of the present invention to provide an apparatus in which the above drawback is eliminated.

A more specific object of the present invention is to provide a transmission apparatus using an in-band type access system having an improved flexibility with regard to management of CLAD units without a limitation due to the physical scale of the involved network.

The above objects of the present invention are achieved by a transmission apparatus comprising means for setting a resource management information path based on a given network management protocol onto PVC logically set traffic defined in ATM switching so that a customer network management agent process and a user network management system can communicate with each other. It is to be noted that conventionally, resource management information is transmitted over the dedicated communication line. According to the present invention, the resource management information path is defined in a transmission channel logically set on a payload carrier, and is transmitted along with user data (cells) in the ATM system. Thus, it is possible to avoid the problems resulting from the use of the dedicated communication line and to improve the flexibility of applications to a large-scale WAN without physical limitations.

The transmission apparatus may further comprise means for setting a resource management information path used for resource management for a cell assembly and disassembly unit.

The transmission apparatus may further comprise means for setting a resource management information path used for resource management for a cell assembly and disassembly unit (for example, an ATM/user network interface) which is accommodated outside of the transmission apparatus as an external unit (for example, customer premises equipment). Thus, a contact point with the user network management system can be made, and the resource management information can be transferred to the customer network management agent process.

The transmission apparatus may further comprise means for setting a resource management information path used for resource management for a cell assembly and disassembly unit which is directly accommodated in the transmission apparatus. Thus, a contact point with the user network management system can be made, and the resource management information can be transferred to the customer network management agent process.

The transmission apparatus may further comprise a controller which provides, through the resource management information path, information having a format understandable by the customer network management agent process. Such a controller has functions such as an ATM cell assembly and disassembly function, an ATM/user network interface function, a packet protocol data unit processing function, an SNMP terminating function, an SNMP application interfacing function, and an SNMP application executing function.

The transmission apparatus may further comprise a controller (for example, means for realizing an IP routing function and an SNMP gateway function) which sends information extracted from the resource management information path to the customer network management agent process via an external interface (for example, an Ethernet LAN). The external interface serves as a cross point with the customer network management agent process other than the resource management information path set on the PVC logically set traffic defined by the ATM switch.

The transmission apparatus may further comprise means for performing a resource management of a facility node in an STM transmission (for example, a data communication channel (DCC), an OS/NE (Operation System/Network Element), or LCN (Local Communication Network)) and a resource management of a cell assembly and disassembly unit in an ATM transmission (for example, ATM PVC, OS/NE or LCN).

The transmission apparatus may further comprise an interface via which the resource management information can be sent to a transaction language (TL1) which performs a facility node resource management in an STM transmission and a common management information service element and can further be sent to the customer network management agent process and the user network management system.

The above objects of the present invention are also achieved by a transmission apparatus comprising: an ATM/ user network interface which makes a contact point with a user network management system which handles resource management information concerning a cell assembly and disassembly unit which is accommodated outside of the transmission apparatus as an external unit; a LAN interface which makes a contact point with another user network management system which handles resource management information concerning another cell assembly and disassembly unit which is directly accommodated in the transmission apparatus; and an external interface which makes a contact point with a customer network management agent process.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of a management method related to the present invention in order to facilitate better understanding of the present invention.

Figure 1:
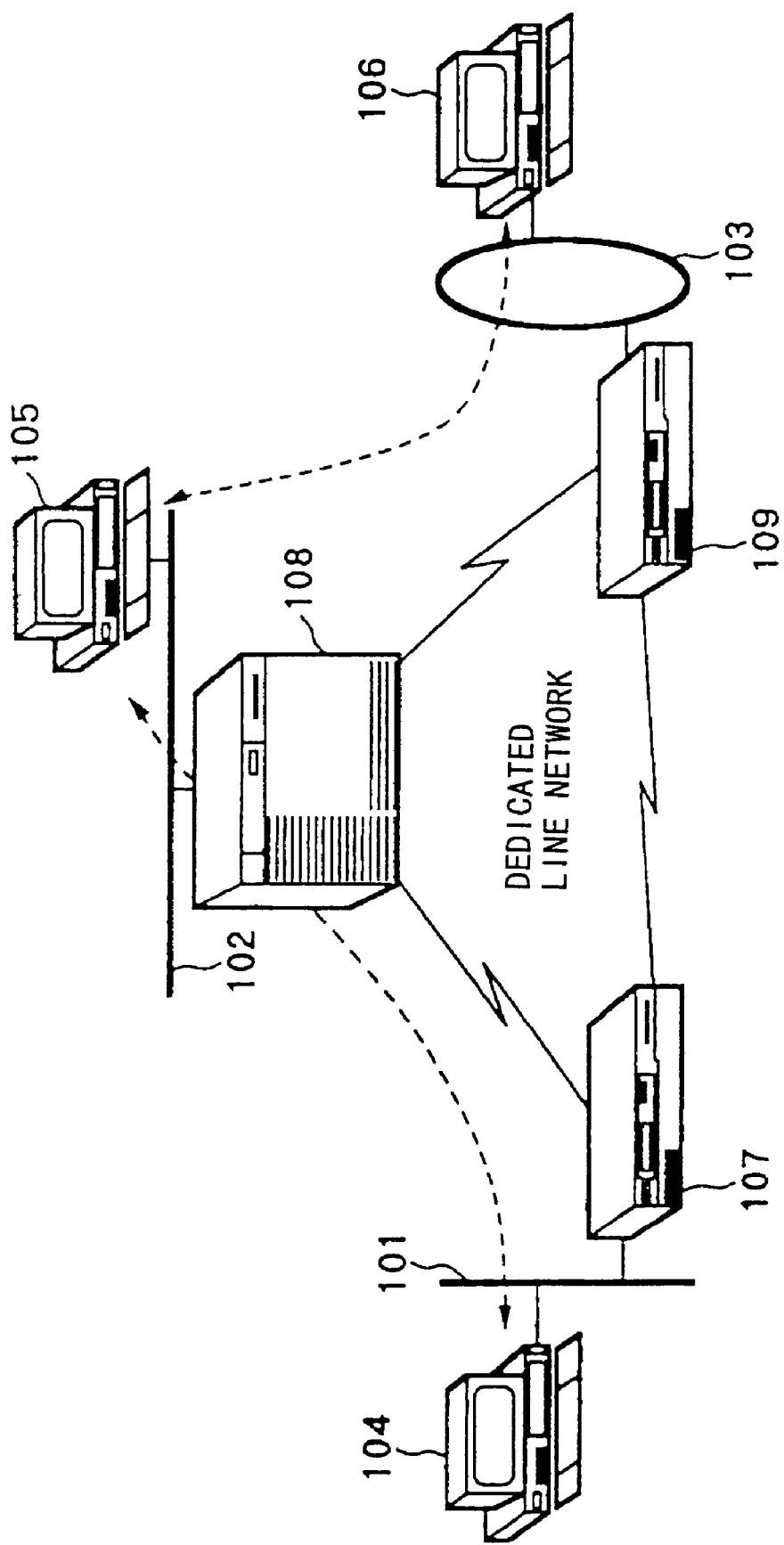
FIG. 1 is a diagram showing a conventional management method.

FIG. 1 shows a management method related to the present invention. A system shown in FIG. 1 includes user's LANs, namely, Ethernet LANs 101 and 102, and a token ring LAN 103. The Ethernet LAN 101 is equipped with a site manager (network management system) 104 and a router 107. The Ethernet LAN 102 is equipped with a site manager 105 and a router 108. The token ring LAN 103 is equipped with a site manager 106 and a router 109. The routers 107-109 are connected by dedicated communication lines. In the network shown in FIG. 1, the site manager 105 functions as a master, and the site managers 104 and 106 respectively function as slaves. The site manager 105 collects management information concerning the site managers 104 and 106 therefrom, and integrally manages the users' networks.

The Ethernet LANs 101 and 102 are media (LAN nodes, also called islands) that are physically and logically different from the token ring LAN 103. These media are linked by the dedicated communication lines. When the network shown in FIG. 1 is expanded to further include a new user's network, it is required to include a site manager in the new network and link it to the other existing site managers by means of dedicated communication lines.

More specifically, as the number of ATM transmission spans linking a large number of CLAD units, the number of end points for making interfaces with the site managers physically increases. In addition, complexity of the network configuration (topology) of the ATM transmission gives impetus to increase in the number of CLAD units. Thus, the above-mentioned management method cannot flexibly cope with alteration of connections between the CLAD units. Further, the management method is capable of achieving only a limited application, in terms of the physical scale, to a large-scale WAN (Wide Area Network) expected to be achieved by the ATM transmission. In practice, the large-scale WAN which employs a virtual LAN (VLAN) or an emulated LAN (ELAN) can be achieved within only a very limited area in which customer premises equipment (CPE) can be configured (for example, within a single user area, a campus or an office block).

Also, in a case where a large number of users' networks is integrally managed, it is very difficult to determine who performs the integral management and who bears the cost thereof including the cost of installation of the dedicated communication lines.

The present invention is made taking into account the above-mentioned issues. More particularly, the present invention is directed to flexibly coping with a change of connections between the CLAD units and making it possible to achieve a large-scale WAN by using ATM transmission without any limitation in terms of the physical scale.

A description will now be given of an embodiment of the present invention. The embodiment of the present invention described below is an application to a transmission apparatus (network equipment) that can be called an "ATM channel switch integrated type composite system with an option of STM channel crossconnect and CLAD accommodation". Hereinafter, such a system is simply referred to as a transmission apparatus.

Figure 2:
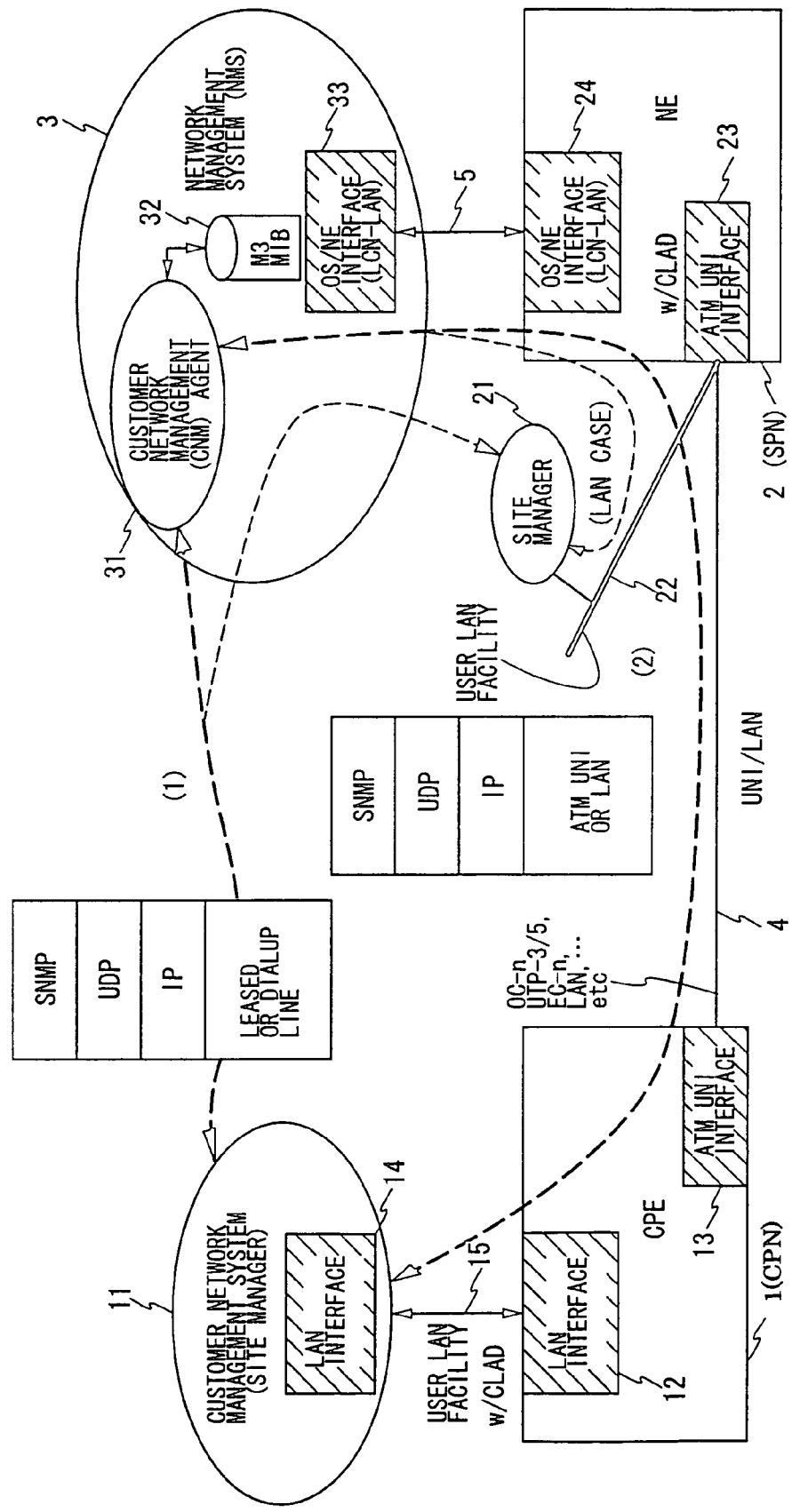
FIG. 2 is a diagram for illustrating an access to a customer network management agent process from a network management system of each user, and a protocol stack utilized in the above process according to an embodiment of the present invention.

A description will first be given of the concept of the whole network configuration by referring to FIG. 2. FIG. 2 is a diagram for illustrating an access to a customer network management agent process from a network management system of each user, and a protocol stack utilized in the above process. The customer network management agent process performs an integrated management of the user's networks on behalf of the respective user's network management systems. The integrated management can be given in charge to a third provider (for example, a management company of an ATM public telephone network). In this case, the entrusted management company can place the transmission apparatus within its own network. Alternatively, a specific one of the management companies which manage the respective user's networks may integrally manage the user's networks.

Referring to FIG. 2, the whole network includes a customer premises network (CPN) 1, a service provider network (SPN) 2, and a network management system (NMS) 3, which system is placed outside of the networks 1 and 2. The management system 3 manages the whole network (except for management of the inside of the user's networks). The networks 1 and 2, and the network management system 3 are equipped with respective network equipment (NE), and are mutually connected via ATM transmission paths.

The customer premises network 1 is connected to a customer network management system (site manager) 11 via a user LAN facility 15 by means of CLAD unit direct accommodation type LAN interfaces 12 and 14. The customer network management system 11 is a user-side network management system (NMS) which manages resources in the customer premises network 1. The service provider network 2 is connected to a site manager 21 by means of a user LAN facility 22. The site manager 21 is a user-side network management system (NMS) which manages resources in the service provider network 2.

The customer premises network 1 and the service provider network 2 are mutually connected via a transmission medium 4 by means of CLAD unit direct accommodation type ATM/user network interfaces 13 and 23. The transmission medium 4 is, for example, an optical signal carrier, an unshielded twisted pair wire (UTP), an electrical carrier (EC), or a LAN.

A network element (NE) is placed into the service provider network 2, and is equipped with an OS/NE interface (local communication network (LCN)-(LAN) 24. The network element (NE) is connected to an OS/NE interface 33 of the network management system 3 via an Ethernet 5. The network management system 3 has the original function of managing the whole network and is further equipped with a customer network management (CNM) agent process 31. The customer network management agent process 31 has a role of integrally managing the site managers of the networks 1 and 2. In the aforementioned related art, such a role is played by the master site manager. The customer network management agent process 31 controls a common management information base 32.

A reference number (1) shown in FIG. 2 denotes that an SNMP access which will be described later is made on a dedicated/dialup line. In connection with the SNMP access (1), there is depicted a protocol stack utilized between the customer network management agent process 31 and the customer network management system 11 of the network 1.

A reference number (2) shown in FIG. 2 denotes that an SNMP access is made by using the transmission medium 4 (which is an ATM/user network interface or a LAN). In connection with the SNMP access (2), there is illustrated a protocol stack utilized by the SNMP access made on the transmission medium 4. In this case, a customer SNMP management path is not terminated by an SNMP (Simple Network Management Protocol) agent process (the detail of which will be described later) placed in the network element NE, but is bypassed.

As will be described in detail later, management information concerning the networks associated with and collected by the user-side site managers 11 and 21, that is, an SNMP management packet (message) is sent to the customer network management agent process 31 of the network management system 3 by utilizing an idle area available in the band of the ATM transmission path established between the transmission apparatuses rather than a transmission path on the switch side. The customer network management agent process 31 integrally manages the network management information concerning the respective user's networks.

Figure 3:
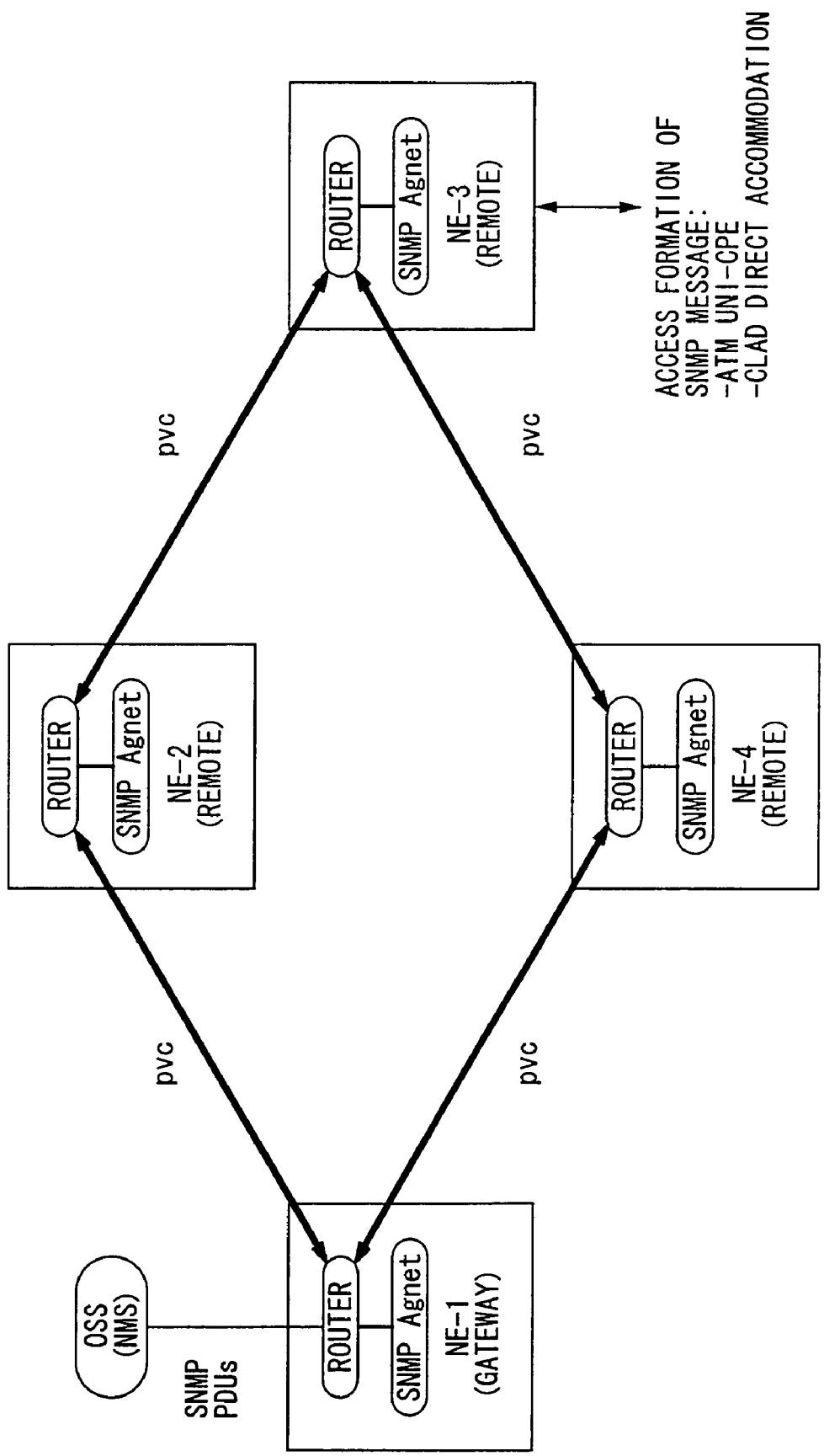
FIG. 3 is a diagram showing routing of an SNMP management packet according to the embodiment of the present invention.

FIG. 3 is a diagram showing routing of the SNMP management packet. In FIG. 3, symbols NE1, NE2, NE3 and NE4 are respectively network elements, and are respectively equipped with routers and SNMP agent processes, which will be described later. The network element NE1 is a transmission apparatus having a gateway function, and the network elements NE2–NE4 are respectively remote transmission apparatuses. The network element NE1 is placed in, for example, a switch office, and is connected with a network management system (or OSS: Operation Support System) which manages the whole network. Information is transmitted and received on an SNMP protocol data unit (PDU)

basis. The above-mentioned network management system is additionally provided with the aforementioned customer network management agent process. The network elements NE1–NE4 are connected together via ATM transmission paths. Provisioning is carried out between the routers of the network elements NE1–NE4. More particularly, provisioning is carried out by using a permanent virtual channel (PVC) used as an information exchange path via which the SNMP management packet is routed to the destination SNMP agent process. Permanent virtual channels as described above are respectively defined between the routers.

As to the network element NE3, a customer in-band type SNMP access, which will be described later, is illustrated as an example. The SNMP management message or package has the following two access formations. The first access formation allows an access via the ATM/user network interface/customer premises equipment (CPE) accommodating the CLAD unit. That is, the access is made via an ATM/UNI information 62 which will be described later. The second access formation allows an access in the case of the CLAD unit direct accommodation (that is, the access is made via a LAN interface 61 which will be described later). The SNMP management message of the user network is sent to the network therefrom by using one of the two access formations, and is delivered to the customer network management agent process 31 via the PCV.

Figure 4:
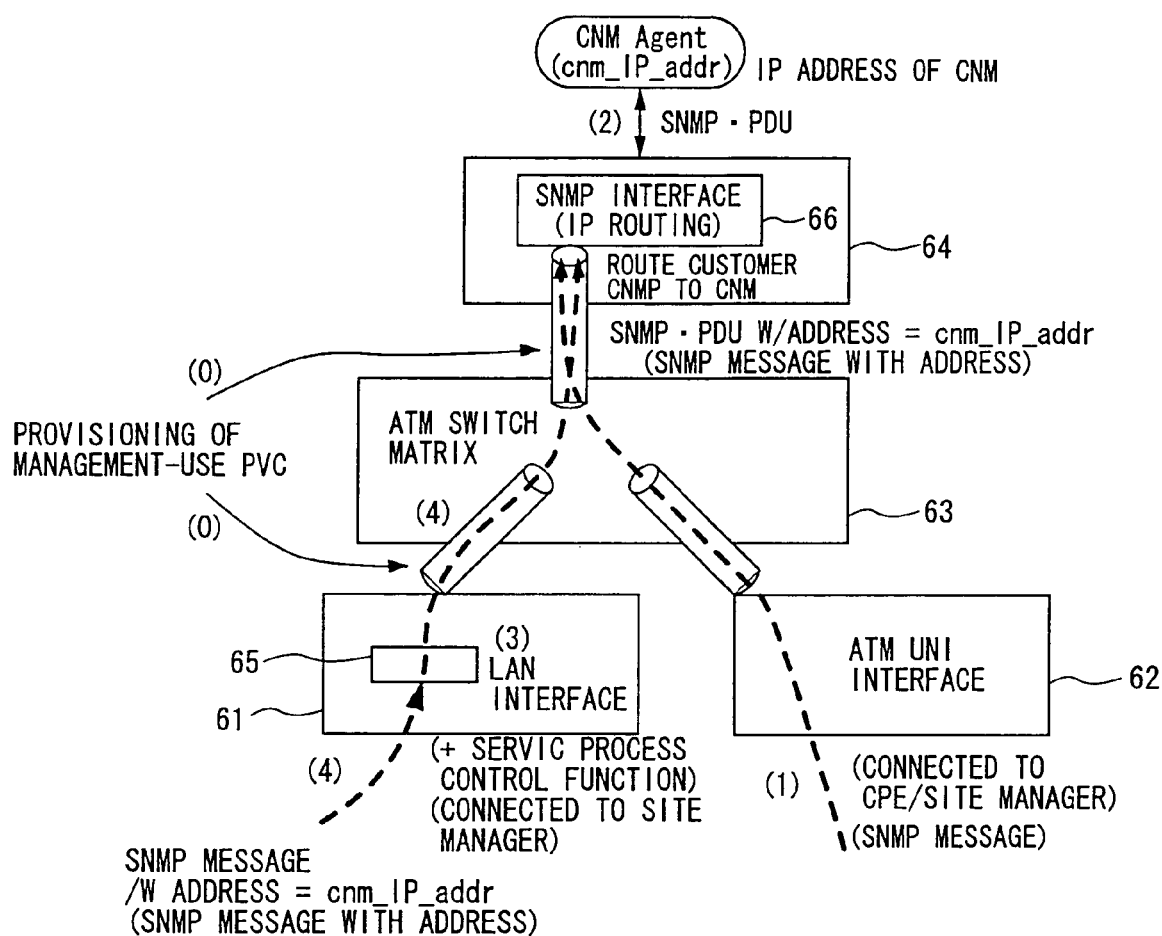
FIG. 4 schematically shows an example of a configuration of a transmission apparatus which functions as a network element according to the embodiment of the present invention.

FIG. 4 schematically shows an example of a configuration of the transmission apparatus which functions as the network element NE according to the embodiment of the present invention. The LAN interface 61, which has briefly been described, accommodates a LAN which does not have the CLAD function. The ATM/user network interface (ATM/UNI) 62, which has briefly been described, accommodates a network having a CLAD function such as an ATM cell relay service. An ATM switch matrix part 63 determines a route. An apparatus controller 64 controls apparatus information in the transmission apparatus. The apparatus controller 64 has an SNMP interface (IP routing) 66, and communicates, on the SNMP protocol data unit basis, with the customer network management agent process (CNM Agent: see FIG. 2) provided outside of the transmission apparatus.

A description will now be given of the main operations and functions of parts indicated by reference numbers (0)–(4) shown in FIG. 4.

(0): Provisioning of a management-use PVC logical channel is performed in order to route the SNMP management message to the customer network management agent process for in-band customer SNMP traffic.

(1): The value of VPI/VCI used by the customer SNMP management message is prepared in the customer premises equipment (which accommodates the CLAD unit) in a case where the SNMP management message is input from an ATM cell relay service (that is, a case where the SNMP management message is transmitted via the ATM/user network interface 62).

(2): An IP-VCC (Internet Protocol—Virtual Channel Connection) lookup entry is created in order to make it possible for the apparatus controller 64 to transmit a customer SNMP request message toward the customer network management agent process (CNM Agent) and send back an SNMP response message to the customer in-building equipment (CPE).

(3): Provisioning of management-use PVC information (concerning the IP and VCC) is performed in a case where the SNMP management message is input from a LAN (that is, a case where the message is transmitted via the LAN interface 61).

(4): The customer SNMP management message from the LAN interface is mapped into an ATM cell by a CLAD unit 65, and is routed toward the customer network management agent process by the ATM switch matrix part 63.

A description will be described of the detail of the above-mentioned transmission apparatus. The transmission apparatus described below is capable of handling both STM (synchronous hierarchical multiplexing) transmission and ATM transmission.

The resource management in the STM transmission uses, as collection/delivery paths for in-apparatus information commonly owned in the network, two data communication channels formed in the overhead. The above resource management is implemented by two types of management process subsets, namely, a TL1 (Transaction Language 1) management subsystem which collects in-apparatus information regarding the STM transmission, and a CMISE (Common Management Information Service Element) subsystem.

The resource management in the ATM transmission also uses, as collection/delivery paths for in-apparatus information commonly owned in the network, two data communication channels formed in the overhead, with regard to information concerning cell transmission and ATM switch (including accounting information). The above resource management is implemented by the TL1 management subsystem and the CMISE subsystem.

In contrast, in the resource management of the CLAD unit itself accommodated in the transmission apparatus, particular cell transmission channels that are logically set on the payload carrier are used as user resources (a resource such as a LAN formation terminal and a router) and paths for collecting and delivering information concerning CLAD accommodating nodes, the paths being commonly owned in the network formed by the above nodes. The above resource management is implemented by a management process subset which is called an SNMP management subsystem and is capable of collecting node information.

The real substance of above three management subsystems is placed in a processor provided in the apparatus controller 64 which controls the apparatus information in the transmission apparatus, and commonly own a common management information base (CMIB: Common Management Information Base), which is controlled under the subsystems.

As an application of the present invention, a description will be given of the structure of resource management paths used for a CLAD unit resource defined as the in-band type SNMP access and a user resource (such as a LAN formation terminal or a router). The term "in-band type" of the in-band type SNMP access is used as a meaning that the resource information provision paths are assigned to particular cell transmission channels logically set on the payload carrier and the ATM transmission is performed together with user data (cells).

The transmission apparatus provides two SNMP interfaces. One of the two SNMP interfaces is an out-band (an external channel carrier) interface via an SNMP management port. The above out-band interface is, for example, the Ethernet shown in FIG. 2. The other SNMP interface is an in-band interface which uses the service function part of the present transmission apparatus, such as an ATM/user network interface or an interface with a LAN. The ATM/UNI transmission medium 4 shown in FIG. 2 is an in-band interface. The term "in-band" is used as a meaning of a carrier subset provided by the particular cell transmission channel logically set on the payload carrier, as has been described previously.

The resource management of the CLAD units are configured so as to cope with the following two cases.

(1) Case 1 (a case via ATM/UNI interface 62):

The present transmission apparatus does not directly accommodate the CLAD unit. However, there is a case where a cell relay service provided by the present transmission apparatus brings the CLAD unit function by means of the CLAD unit provided in the customer premises equipment (CPE) located in a position opposite to the present transmission apparatus. In such a case, the SNMP management subsystem of the present transmission apparatus puts resource management information concerning the CLAD unit up on the customer network management agent process (CNM Agent) located outside. Thus, an exchange of the resource management information concerning the CLAD unit between the customer network management agent process and the site manager located on the side of the ATM cell relay service network is bypassed.

(2) Case 2 (a case via the LAN interface 61):

When the present transmission apparatus accommodates the CLAD unit, the SNMP management subsystem of the present transmission apparatus provides resource management information concerning the CLAD unit.

In order to cope with the above-mentioned two cases, it is required that the out-band access and the in-band access cooperate with each other. Such a cooperation will be described with reference to FIG. 2.

The present transmission apparatus is equipped with an OS/NE (Operation System/Network Element) for the out-band access (see the OS/NE interface 24 shown in FIG. 2). Generally, the OS/NE interface is a LAN (Ethernet) or X.25. However, in the present embodiment of the invention, only a LAN port is presented as an interface with the out-band access because the LAN underlies the physical layer of the SNMP-system application (see Ethernet 1 shown in FIG. 2). The customer network management agent process 31 connected to the LAN port is the object of the out-band access. However, the customer network management agent process 31 is generally placed in an agent formation as a part of the network management system 3 of the user.

With regard to the in-band access, the site manager provided under the following condition is the object of the in-band access. That is, the site manager is connected to the LAN network extending to the user side via the CLAD unit in the customer premises equipment located in a position opposite to the present transmission apparatus by the cell relay service using the ATM transmission (see the LAN interface 12 shown in FIG. 2) or the CLAD unit which is directly accommodated in the present transmission apparatus (see the ATM/UNI interfaces 13 and 23 shown in FIG. 2).

In this regard, the in-band type SNMP access is implemented by forming the information path of the customer network management agent process by the out-band access and the in-band access. However, besides the in-band type SNMP access, an OSI-7L (Open System Interconnect-7 Layer) coexists in the out-band access for supporting the OS/NE interface.

Further, in the present transmission apparatus, all SNMP packets exchanged by the customer network management agent process are flowed to the upper network management system only in order to efficiently support the customer network management agent process and ensure security of information at maximum in terms of the situation in which the SNMP management subsystem of the present transmission apparatus puts resource management information concerning the CLAD unit up on the customer network management agent process (CNM Agent) located outside, and an exchange of the resource management information concerning the CLAD unit between the customer network management agent process and the site manager located on the side of the ATM cell relay service network is bypassed. The above upper network management system is a system which takes the position that it manages the whole network or a shared part of the network (see the network management system 3 shown in FIG. 2).

It will be seen from the above description that in the in-band type SNMP access, the SNMP management subsystem located at the interface between the out-band access and the in-band access should have two functions. One of the two functions is an external interface support function, and the other is the SNMP agent function.

The external interface function establishes and maintains an SNMP connection by an external SNMP management provider such as the customer network management agent process 31 placed ahead of the OS/NE interface and the UDP/IP (User Datagram Protocol/Internet Protocol).

The SNMP agent process function as shown in FIG. 3 handles the SNMP management information and prepares SNMP information exchange requests and a response process for these requests. More particularly, the SNMP agent process that has the common management information base (CMIB) under the control accesses the common management information base by using an appropriate application interface when the SNMP management message comes to the present transmission apparatus via the SNMP management port irrespective of whether the message is based on the in-band access or the out-band access. Then, the SNMP agent process gets information from an abstraction function unit placed in the common management information base and sets (requests) an operation as a logical window of a detection system (such as condition, PM, or alarm) or an operation system (control or provisioning) which cooperates with the physical substance of the present transmission apparatus.

In addition, the SNMP agent process also supports an autonomous report process. More particularly, the SNMP agent process transfers information concerning a predetermined failure in hardware or software to all SNMP management providers in the network by a method called an SNMP trap, so that internal information in the respective SNMP management providers can be updated.

The in-band access system operation requires the following functions which serve as hands and feet for exchanging information by the above-mentioned SNMP management subsystems.

IP Routing Function

An IP routing function is implemented on the SNMP management subsystems, and routes, from the OS/NE interface, all SNMP management packets sent by the in-band access towards the customer network management agent processes placed outside.

Information Path Setting Function

An information path setting function sets a logical channel for a cell transmission in a permanent connection formation in the ATM switch matrix part 63 of the present transmission apparatus. The information path setting function sets an information exchange path between a user-system facility interface part (LAN interface 61) with accommodation of the CLAD unit (which is in the local or the present transmission apparatus, or a remote apparatus other than the present transmission apparatus) or the cell relay service part without accommodation of the CLAD unit and the IP routing function part of the SNMP management subsystem in the apparatus controller 64.

A description will now be given of the resource management of the CLAD unit based on the above two functions with regard to the aforementioned two cases (Case 1 and Case 2). More particularly, the following description is directed to a scenario as to how the IP routing function operates.

(1) Case 1:

Case 1 is applied to a service interface called ATM/user network interface (ATM/UNI). The IP routing function of the customer premises equipment (CPE) inquires of the customer network management agent process 31 which VPI/VCI (Virtual Path Identifier/Virtual Channel Identifier) should be used to establish the SNMP management information path, that is, which particular cell transmission channel logically set on the payload carrier should be used. Then, the customer premises equipment (CPE) registers the VPI/VCI determined by the agent process 31 in its own local routing information table. Once the routing information is taken in the customer premises equipment, the ATM switch matrix part 63 of the present transmission apparatus can exchange, at any time, the SNMP management message in the same manner as that of an exchange of a message with a connection path, and can send the SNMP management message to the customer network management agent process 31 of the destination node.

(2) Case 2:

Case 2 is applied to the LAN interface (LAN interface 61) which accommodates the CLAD unit. In this case, when the first SNMP management message arrives along with the IP address addressed to the customer network management agent process 31, the IP routing function of the LAN interface 61 operates and asks the IP packet switch part of a service process control part of the LAN interface 61 having predetermined PVC information to issue PVC information. Then, the IP routing function registers the PVC information thus obtained in its own LAN/IP routing information table located in a local position of the IP routing function. Thus, it becomes possible to easily add the values of the VPI/VCI obtained by the IP routing function of the LAN interface 61 to any incoming SNMP management message with the same IP address added thereto. As a result, it is possible to cause the SNMP message to pass through the PVC indicated by the PVC information and route it to the customer network management agent process connected to a similar "tube" of the PVC.

A further detailed description will be given, with reference to FIGS. 5 through 9, of the present transmission apparatus.

Figure 5:
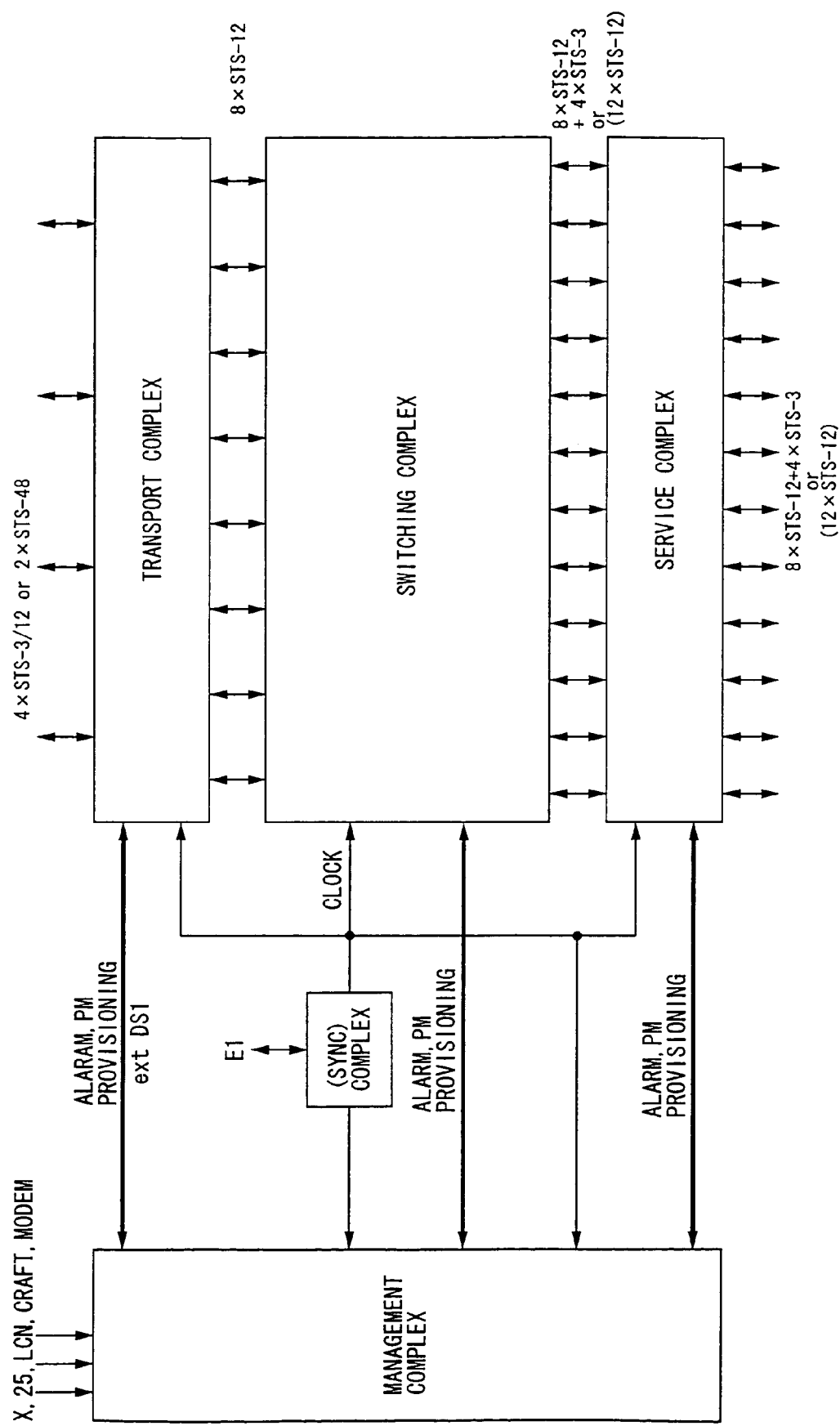
FIG. 5 is a block diagram illustrating the function of the transmission apparatus according to the embodiment of the present invention.
Figure 6:
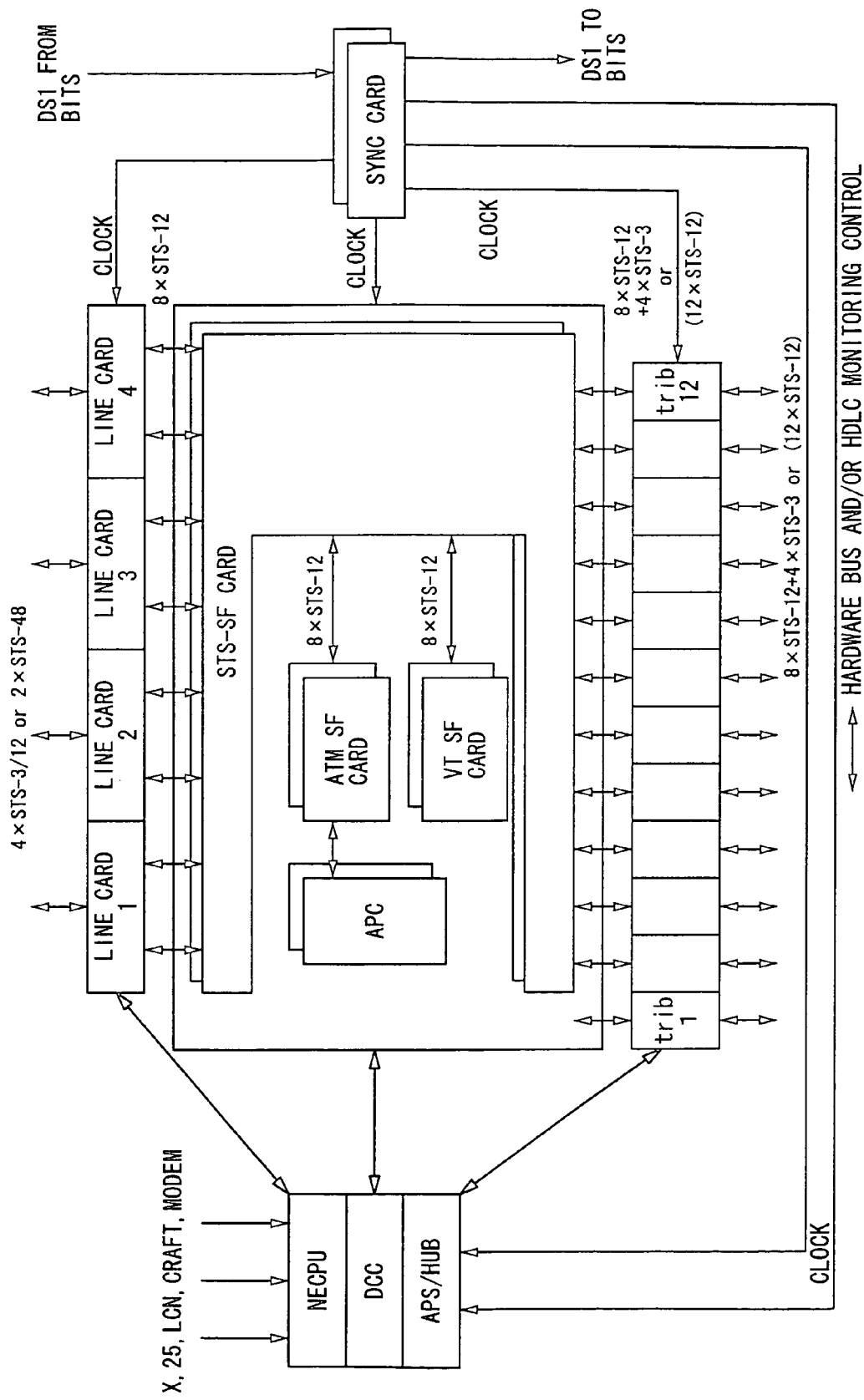
FIG. 6 is a diagram of a hardware structure of the transmission apparatus according to the embodiment of the present invention.
Figure 7:
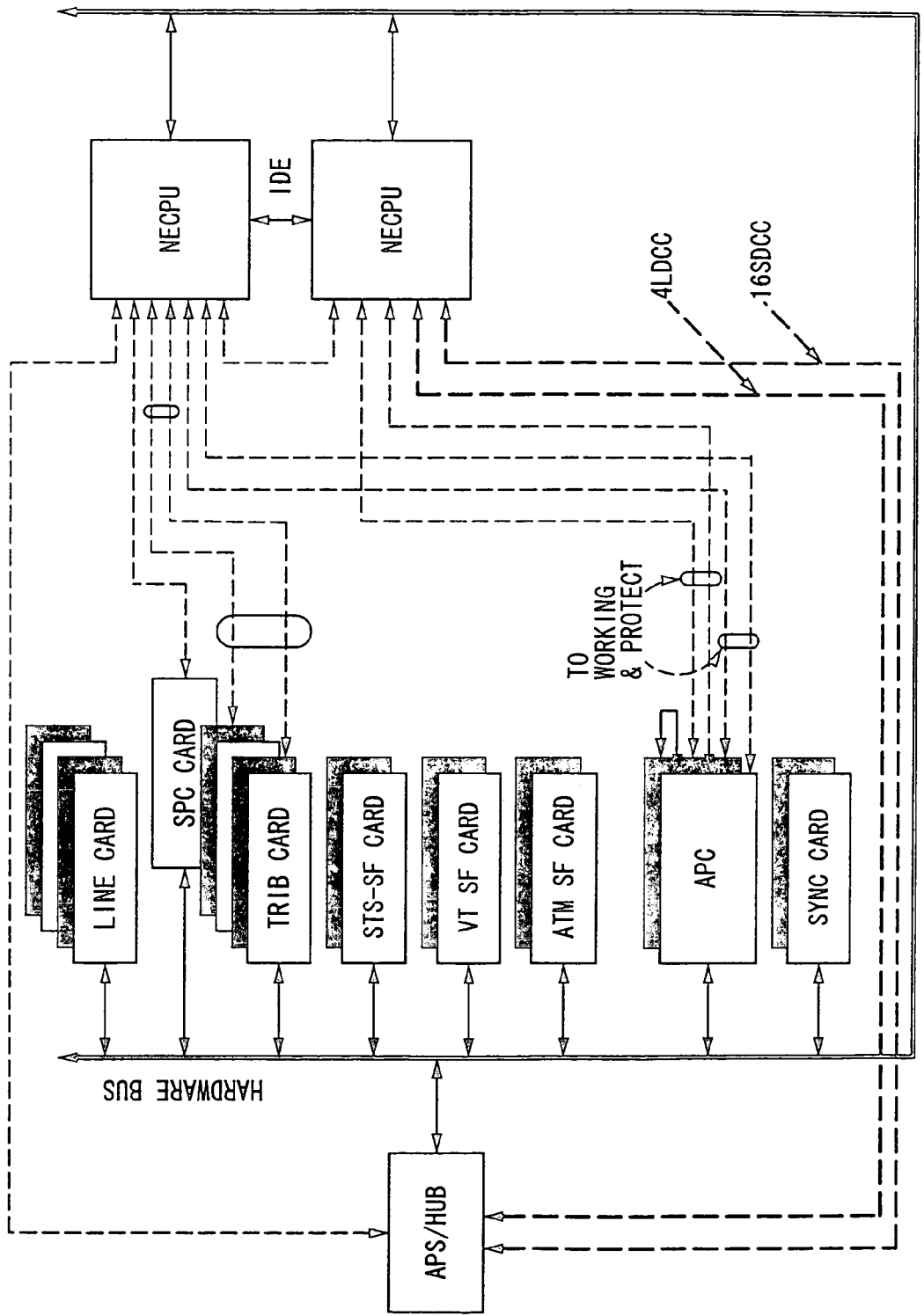
FIG. 7 is a block diagram of a control system of the transmission apparatus according to the embodiment of the present invention.
Figure 8:
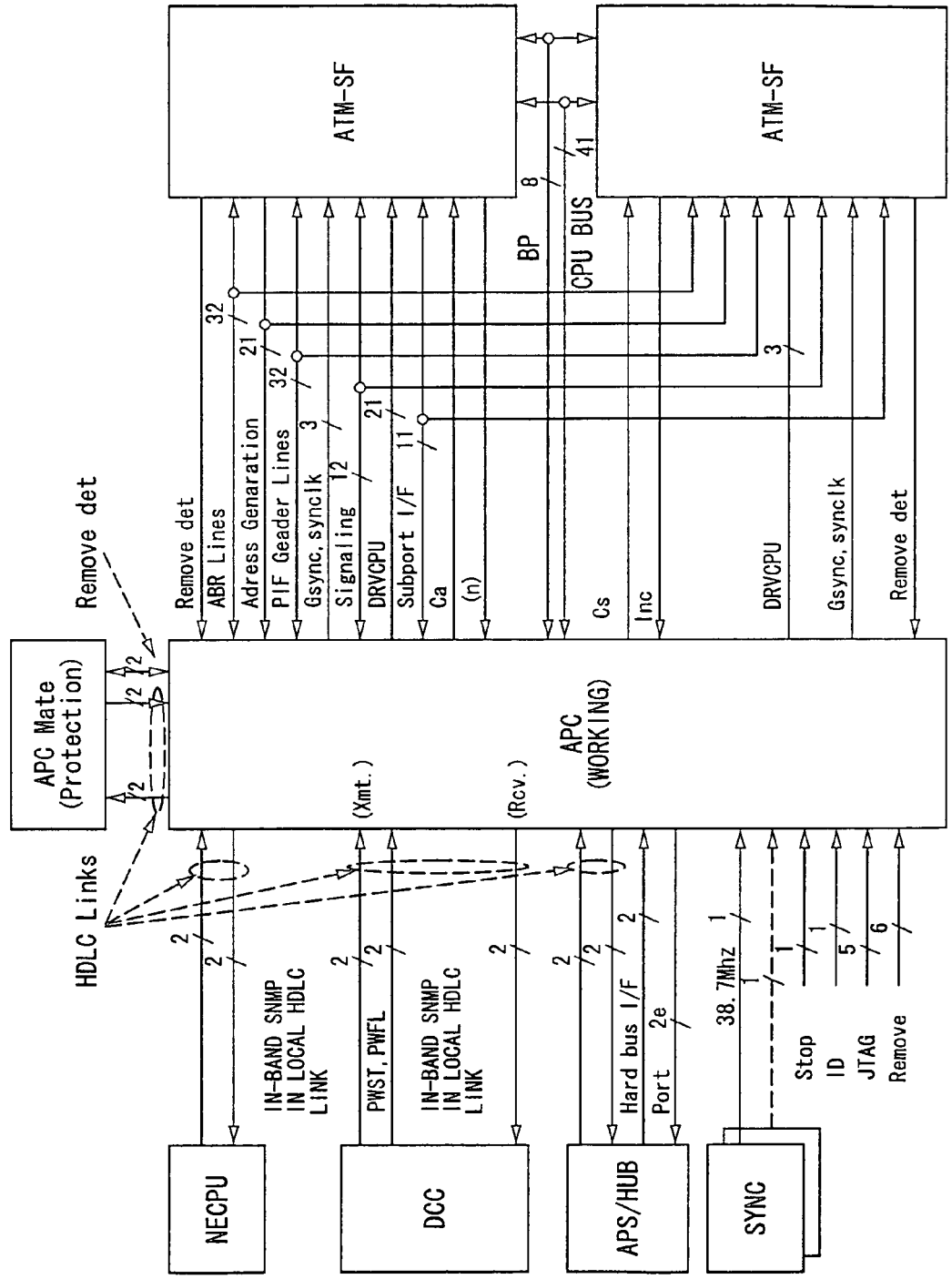
FIG. 8 is a block diagram of an APC (ATM Processing Control) part of the control system thereof shown in FIG. 7 and a peripheral part thereof.
Figure 9:
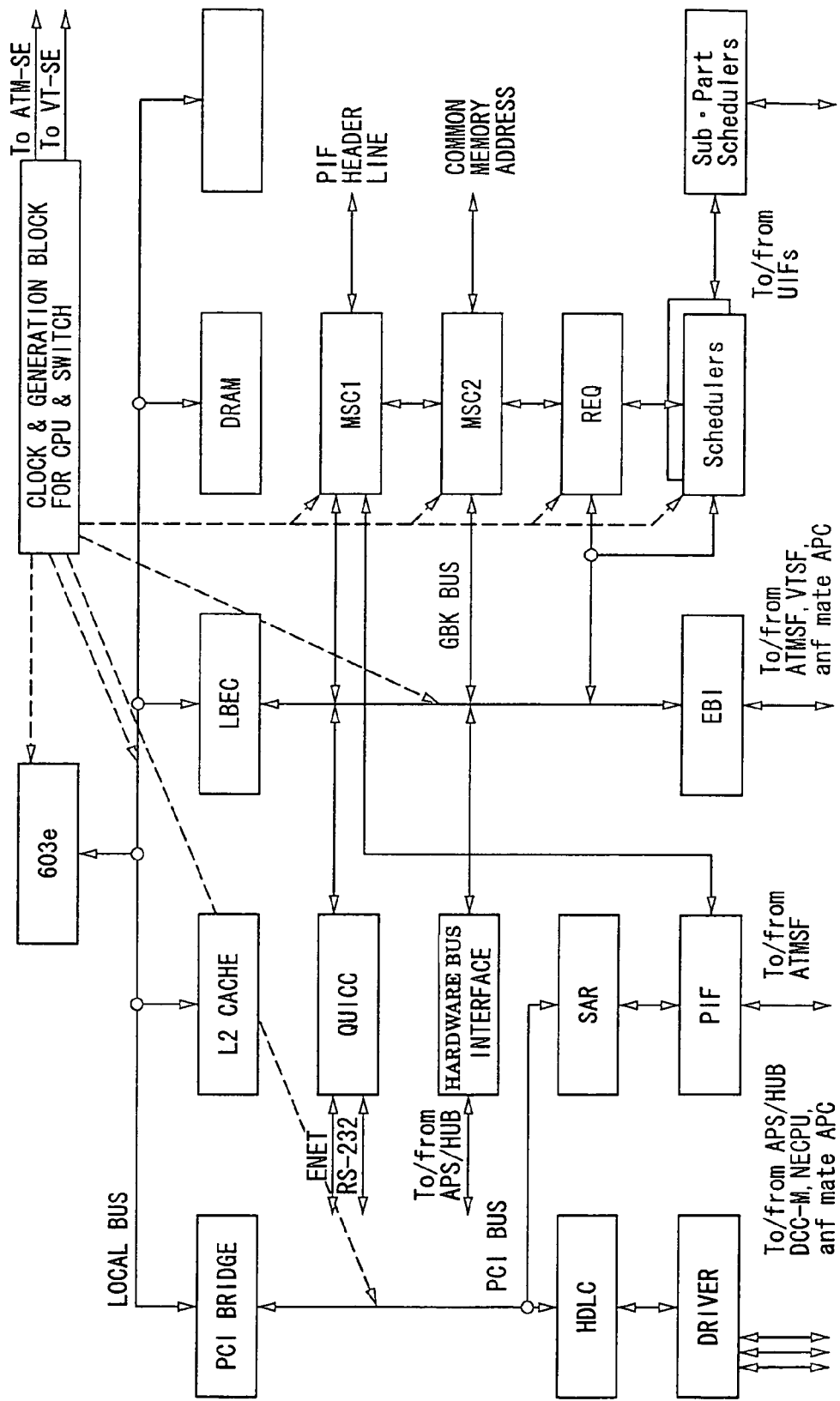
FIG. 9 is a block diagram of a detailed structure of the APC part of the transmission apparatus shown in FIG. 8.

FIG. 5 is a block diagram illustrating the function of the present transmission apparatus. FIG. 6 is a diagram of a hardware structure of the present transmission apparatus. FIG. 7 is a block diagram of a control system of the present transmission apparatus, and FIG. 8 is a block diagram of an APC (ATM Processing Control) part of the control system thereof and a peripheral part thereof. FIG. 9 is a block diagram of a detailed structure of the APC part of the present transmission apparatus.

First, a description will be given of the whole operation and function of the present transmission apparatus.

Referring to FIG. 5, the SNMP protocol data unit (PDU) of the site manager interfaced by the ATM/UNI (via CPE) or LAN (direct accommodation) is coupled to a service complex of the present transmission apparatus shown in FIG. 5 in such a manner that an ATM/UNI channel card is coupled in the ATM cell formation and a LAN card is coupled in the packet formation. These cards are those among a group of cards called "trib" (see FIG. 6). The SNMP protocol data unit thus coupled to the service complex interfaced by the ATM/UNI channel card is sent to a switching complex shown in FIG. 5 as it stands (without missing the ATM cell formation). The SNMP protocol data interfaced by the LAN, which is arranged in the package formation, is mapped, by segmentation, on the ATM cell(s) by the CLAD unit accommodated in the transmission apparatus. The ATM cell thus produced is sent to the switching complex.

The SNMP protocol data unit arranged in the ATM cell formation is applied to the switching complex and is taken in an STS-SF (Synchronous Transport Signal Switch Fabric) card shown in FIG. 6. Then, the SNMP protocol data unit is transferred to an ATM-SF card having ATM visibility shown in FIG. 6. The ATM-SF card compares the VPI/VCI values corresponding to the IP address with which the SNMP should be terminated with the VPI/VCI values described in the header of the incoming ATM cell. If both the VPI/VCI values coincide with each other, the ATM cell is extracted and is then subjected to a cell spacing adjustment. Then, the ATM cell is sent to the APC (ATM Processing Control) via a PIF (Port InterFace.

The SNMP protocol data unit sent to the APC is reassembled into an SNMP-PDU packet due to the function of an SAR on the APC and is encapsuled on an HDLC frame (see FIG. 9). The encapsuling format on the HDLC frame can be realized by an arbitrary method which matches the HDLC, such as ATM-DXI (Data Exchange Interface).

The SNMP protocol data unit encapsuled on the HDLC is transferred from the APC to the DCC via an HDLC local link provided between the APC and DCC (see FIGS. 7 and 8). The DCC is equipped with a protocol stack which terminates the underlay part of the SNMP protocol data unit. However, the routing-related function is not included because the in-band type SNMP is static routing by pre-provisioning and does not need the autonomous routing. The DCC is equipped with a dedicated message transfer path (which is an HDLC local link between a CPU (NECPU) of the transmission apparatus and the DCC) toward the NECPU.

The DCC is also equipped with an LCN interface separate from an APC-DCC-NECPU system path, and realizes mutual work with the present transmission apparatus through an SNMP-PDU based communication with the customer network management agent process connected to a port to which the LCN interface is connected (see FIG. 4).

The SNMP message sent to the NECPU is extracted as information for operating its own common management information base (CMIB) by a high-order process, and is utilized as a database configuration information element for performing the LAN-system resource management and network management.

The database thus built up can be referred to by the external customer network management agent process by coupling the LCN port on the DCC by means of the NECPU-DCC-LCN system path.

Referring to FIG. 5, the whole function configuration of the present transmission apparatus is made up of the following five complexes. Each of the five complexes has the following functions.

Transport Complex
    LINE terminating function
    SONET (OC-n)/SDH transport function Service Complex
    TRIB terminating function
    STM/ATM/LAN/FR accommodating function where FR is an abbreviation of the frame relay Switching Complex
    LINE/TRIB traffic (data unit and frame timing) connecting function on the STS/VT/ATM cell bases
    STS/VT-TSI function by crossconnect
    VC/VP-ATM exchanging function Synchronization Complex
    System timing synchronizing function by determination and distribution of in-apparatus timing Management Complex
    Severance by in-apparatus information collection and exchange and as carrier quality checking and performance evaluating function
    Apparatus operation executing (including download and backup) function
    Network management (TL1, FTAM, CMLSE, SNMP, FTP) interface function.

Referring to FIG. 6, packages/units forming the hardware structure of the present apparatus are configured by groups of regular or optional packages/units as described below. The terms "regular" and "optional" are a category on an application function basis. Another category based on a discrimination between electrical and optical carriers, a working/protection discrimination, a large/small channel capacity and a performance/capability based grade is a menu of packets/units.

(1) Regular Package/Unit

Transport Complex
    LINE . . . OC-12 (STS/STSc/CRS)/OC-3 (STS/STSc/CRS) where CRS denotes cell relay service.

Service Complex
    TRIB . . . DS1(VT1CRS)/DS3(STS/CRS)/DS1FR/LAN (electrical signal system Ethernet) where FR denotes frame relay.

Switching Complex
    STS-SF, VT-SF, ATM-SF/APC where APC denotes ATM processing control.

Synchronization Complex
    SYNC

Management Complex
    NECPU/DCC/APS-HUB where APS-HUB denotes automatic protection switching, hubing where APS is an abbreviation of Automatic Protection Switching.

(2) Optional Package/Unit

Transport Complex
    LINE . . . OC-48 (STS/STSc/CRS)

Service Complex
    TRIB . . . DS1CE/DS1MA/DS3TR/DS3FR/DS3CE/LAN (optical signal system Ethernet)/LAN (token ring)/SPC where CE denotes circuit emulation, IMA denotes inverse multiplex adapter, TR denotes transmux, and SPC denotes service processing control.

Switching Complex
    none

Synchronization Complex
    none

Management Complex
    OW/OW-MDM where OW denotes order wire, and MDM denotes modem.

The packages/units have the following shared functions.

(1) Line
    This provides an optical carrier a node-to-node transport up to OC-3, OC-12 and OC-48. The STS or STSc is used for the transmission payload, and SPE and OH (overhead) are transmitted and received. As to SPE, a complex connection with STS-SF is made. As to OH, a complex connection with OHD on APS/HUB is made.

(2) Trib
    The packages/units TRIB (trib) are channel units which terminate electrical carriers (such as DS1, DS3, FR, LAN-ELC), channel units which terminate optical carriers (OC-3, OC-12, LAN-OPT), and router units (SPC) that perform LAN routing (such as a VLAN system and an IP system). The STS-SF and OHD are complex-connected. The optical-system units are functionally and physically diversion of LINE except for the LAN-OPT. In the electrical-system units including the LAN-OPT, a TDM-system (channel) bearer, an ATM-system (cell) bearer, an IP-system (packet) bearer, and a data-system (an encapsuled packet) bearer are mapped and demapped between the STSc or STS and STS/VT. Particularly, the units which handle packets (including a decapsuled packet) or an in-channel bit stream (CE: circuit emulation, TDM/ATM conversion) requested to be assembled in the cell formation has the function of the CLAD (which cells and decells a packet).

(3) STS-SF
    Traffic of STSc or STS which is complex-connected with LINE, TRIB is handled on an STS basis. The crossconnection of STS/STSc is made by a static allocation by the setting of the operation. For the process on the VT basis or cell basis, there is providded a complex connection with VT-SF and ATM-SF.

(4) VT-SF
    Traffic in complex-connection with STS-SF is handled on the VT basis. The crossconnection of VT is made by the static allocation by the setting of the operation.

(5) ATM-SF, APC
    Traffic in complex-connection with STS-SF is handled on the cell basis. The crossconnections of the VC/VP of cells gathered on a use unit basis are subjected, for both the user/network interface (UNI) and the network/network interface (NNI), to a given procedure defined between adjacent nodes and is autonomously made between exchange intelligence parts. The execution of the procedure depends on exchange of related information between adjacent nodes and the management of the internal states of the respective nodes. The above function is handled by the APC. ATM-SF provides physical and logical interfaces for the above information exchange, and makes the crossconnections indicated by the procedure. After the crossconnections are made, traffic is subjected to the quality check and performance evaluation. Then, it is determined whether the values actually obtained by the quality check and performance evaluation match the logical values regarding the quality and performance defined on the procedure. If there is a mismatch, a given action is performed. The autonomous operation on the crossconnections based on the procedure between the exchange intelligence parts is recorded as an exchange execution unit. There is also provided with means for controlling the use of channels in a quantitative fashion on the basis of whether an exchange connection fails or not.

The autonomous crossconnections are categorized into any of the following three types, PVC, software PVC and SVC, which depend on the subject which issues a request. The PVC and software PVC execute the static allocation. There is a PVC which indicates a connection route in a fully manual fashion, and a software PVC in which predetermined route information is input and set and connection route information is determined with a help of a PNNI (Private Network to Network Interface) software. The SVC executes a dynamic allocation. Also, as an independent control algorithm, the ATM-SF and APC perform an APS (Automatic Protection Switching) control for execution of ATM path protection (VP servibility) and manages the execution.

(6) SNYC

This handles a system timing synchronization due to determination and distribution of the in-apparatus timing.

(7). NECPU

This maintains the in-apparatus management information base. This serves as a brain which supplies, by messages, associated hardware parts with concrete instructions based on logical actions extended in the virtual field by an external operation so that the logical actions are changed to physical and tangible actions. More particularly, the NECPU executes surveillance, quality check and performance evaluation due to in-apparatus information collection and exchange and executes operations on the transmission apparatus (including download and backup).

(8) DCC

This has a physical path for information exchange with the external operation and a logical channel equipped with a connection procedure on a layer structure (protocol) basis. The DCC cooperates with the NECPU to form the network management (TL1, FTAM, CMISE, SNMP, FTP) interfaces.

(9) APS/HUB

This functions as an actuator, which directly contacts packages/units forming hardware parts which are in charge of transport, service, switching, synchronization and so on, and interprets operation messages issued by the NECPU or the like in order to convert the operation messages into the physical and tangible actions. The APS/HUB also functions as a sensor which collects and interprets physical and tangible states and phenomena of the packages/units, and sends resultant operation messages to the NECPU. Further, as an independent control algorithm, the APS/HUB is in charge of APS control and management of execution. Examples of the APS control are path protection (UPSR, STS-BLSR, VT-BLSR), line protection (optical units), apparatus protection (electrical units, and units in switching and synchronization complexes).

(10) OW, MDM

This has an order wire function and a modem unction which extends a local craft to a VF band for remote crafting.

The present invention is not limited to the specifically disclosed embodiments, and variations and modifications may be made without departing from the scope of the present invention.

What is claimed is:

1. A transmission apparatus comprising:
   an ATM/user network interface which makes a contact point with a first user network management system which handles first resource management information concerning a first cell assembly and disassembly unit which is accommodated outside of the transmission apparatus as an external unit;
   a LAN interface which makes a contact point with a second user network management system which handles second resource management information concerning a second cell assembly and disassembly unit which is directly accommodated in the transmission apparatus;
   an external interface which makes a contact point with a customer network management agent process; and
   a switch;
   wherein the transmission apparatus is configured to allow the customer network management agent process, the first user network management system and the second user network management system to communicate with each other using at least one logically defined resource management path permanently set in the switch,
   wherein an in-band simple-network-management-protocol (SNMP) access is implemented by forming an information path of the customer network management agent process by an out-band access and an in-band access, and
   wherein the transmission apparatus further comprises an interface via which both the first and second resource management information can be sent to a transaction language management subsystem which performs a facility node resource management in an STM transmission and a common management information service element subsystem, and can further be sent to the customer network management agent process and the first and second user network management systems.

2. The transmission apparatus as claimed in claim 1, further comprising means for setting a resource management information path used for resource management for a cell assembly and disassembly unit.

3. The transmission apparatus as claimed in claim 1, further comprising means for setting a resource management information path used for resource management for the first cell assembly and disassembly unit which is accommodated outside of the transmission apparatus as an external unit.

4. The transmission apparatus as claimed in claim 1, further comprising means for setting a resource management information path used for resource management for the second cell assembly and disassembly unit which is directly accommodated in the transmission apparatus.

5. The transmission apparatus as claimed in claim 1, further comprising a controller which provides, through the resource management information path, information having a format understandable by the customer network management agent process.

6. The transmission apparatus as claimed in claim 1, further comprising a controller which sends information extracted from the resource management information path to the customer network management agent process via an external interface.

7. The transmission apparatus as claimed in claim 1, further comprising means for performing a resource management of a facility node in an STM transmission and a resource management of a cell assembly and disassembly unit in an ATM transmission.

* * * * *